(12) United States Patent
Sølling

(10) Patent No.: US 6,478,150 B1
(45) Date of Patent: Nov. 12, 2002

(54) STORAGE DEVICE FOR A DATA CARRIER

(75) Inventor: Tino Sølling, Copenhagen (DK)

(73) Assignee: Scanavo A/S, Copenhagen (DK)

( * ) Notice: Subject to any disclaimer, the term of this patent is extended or adjusted under 35 U.S.C. 154(b) by 0 days.

(21) Appl. No.: 09/857,728

(22) PCT Filed: Dec. 8, 1999

(86) PCT No.: PCT/DK99/00689

§ 371 (c)(1),
(2), (4) Date: Jun. 8, 2001

(87) PCT Pub. No.: WO00/34954

PCT Pub. Date: Jun. 15, 2000

(30) Foreign Application Priority Data

Dec. 9, 1998 (DK) ........................ 1998 01633

(51) Int. Cl.⁷ ............................................. B65D 85/57
(52) U.S. Cl. ..................... 206/308.1; 206/310; 206/493
(58) Field of Search .............................. 206/308.1, 309, 206/310, 311–313, 493

(56) References Cited

U.S. PATENT DOCUMENTS

| | | | | |
|---|---|---|---|---|
| 5,899,327 A | * | 5/1999 | Sykes ....................... | 206/307.1 |
| 5,950,822 A | * | 9/1999 | Cloran et al. ............. | 206/308.1 |
| 5,996,788 A | * | 12/1999 | Belden et al. ........... | 206/308.1 |
| 6,085,900 A | * | 7/2000 | Wong ....................... | 206/308.1 |
| 6,170,656 B1 | * | 1/2001 | Cerda-Vilaplana et al. ....................... | 206/308.1 |
| 6,276,524 B1 | * | 8/2001 | Cerda-Vilaplana et al. ....................... | 206/308.1 |
| 6,286,671 B1 | * | 9/2001 | Liu et al. ................. | 206/308.1 |
| 6,347,702 B1 | * | 2/2002 | Bruderer et al. ......... | 206/308.1 |

* cited by examiner

*Primary Examiner*—Shian Luong
(74) *Attorney, Agent, or Firm*—Dykema Gossett PLLC

(57) ABSTRACT

The invention relates to a storage device comprising: a base element, at least two flexible arms extending in a direction perpendicular to the base element, at least one support element for supporting the data carrier at the outer circumference, the support element leaving a space allowing a grip under the circumferential rim of the data carrier. The invention further relates to a box comprising a storage device according to the invention.

5 Claims, 3 Drawing Sheets

STORAGE DEVICE FOR A DATA CARRIER

BACKGROUND OF THE INVENTION

Data carriers of the type relevant for the present invention comprise a carrier surface having a circular outer circumference. The data carrier comprises a central hole. Such data carrier is used for storage of various sorts of data, primarily digital data. Examples of such data carriers are CD's and DVD's, e.g. for music storage, for data program storage, for game storage or for movie storage. The disc's have the same physical dimensions.

For the storage of the data carrier itself various storage devices have been used and described.

One example is the commonly known jewel box, which normally is used for storage of music CD's. This previously known box comprise a base plate from which a number of arms project upwardly in a circular arrangement. The arms are flexible and are adapted to hold the CD at the central hole of this when it is pressed downward over the arms. In order to remove the CD from the box it is necessary to grip the disc and, by applying a pulling force, release the disc from the arms. This procedure gives rise to several problems. First of all because it is difficult to get hold of the disc by hand as the access to the rim of the disc is limited, and secondly the grip actually obtained may be poor, possibly leading to a loss of grip. Furthermore the data-carrying surface of the storage device may contact the base part, which may lead to the loss or damage of data. This in a minor problem in connection with music, since data correction most often is present in the reading devices. In connection with other types of data this may however be crucial. It is obvious that this previously known device due to these disadvantages need to be replaced.

A further previously known device is disclosed in WO 96/14636. This previously known device features a press and release function, which by means of either the flexibility of flexible ejector elements in a base element or the flexibility of the disc.

Furthermore the providing of a mechanical release and ejector system does require a significant accuracy in the manufacturing process in order to provide a satisfactory function with a low or zero failure frequency in the release function. The lack of the required accuracy in the tolerances may in fact lead to the before mentioned malfunction.

I still further prior art storage device is disclosed in EP 0356539. This previously known storage device is like the one described above of the type featuring a press and release function. The device is described as a development taking its starting point in a storage device corresponding to the above mentioned jewel box. The difficulties mentioned above in connection with WO96/14636 also counts for this storage device, meaning that a significant accuracy is required in order to ensure a satisfactory function and that the risk of a malfunction is high.

The construction disclosed in U.S. Pat. No. 5261534 comprises a base element, three flexible arms extending in a direction perpendicular to the base element, three or four support elements for supporting the data carrier at the outer circumference where the support element leaves a space allowing a grip under the circumferential rim of the data carrier.

This previously known construction provides a simplicity, which is satisfactory from a production point of view, however in use the construction shows several drawbacks. When attempting to release a data carrier form the storage device the user will press his/her finger against the flexible arms, hereby preventing the movement of these to a degree where the data carrier may be released. Furthermore there is a risk of bending the arms too much, hereby introducing material fatigue.

Based on this prior art the aim of the present invention is to provide a storage device for a data carrier, which has a reliable function, which further facilitates the release of the data carrier from the storage device and which at the same time is simple from a manufacturing point of view.

SUMMARY OF THE INVENTION

According to the invention this is obtained by means of a storage device comprising:
- a base element;
- at least two flexible arms extending in a direction substantially perpendicular to the base element;
- at least one support elements for supporting the data carrier at the outer circumference;
- the support element leaving a space allowing a grip under the circumferential rim of the data carrier.

By means of such storage device it is possible to perform a reliable release of the data carrier from the storage device due to the possibility of accessing the rim of the data carrier in a more reliable and easy manner. The locking means will not provide any partly locking malfunction as they do not comprise any elements, where the function of these rely on the function of other similar elements. Since there are no mutually dependent release and ejector elements which requires a significant accuracy in the manufacturing process the storage device according to the invention does beside the above mentioned improved functionality provide a storage device which is simple from a manufacturing point of view. This also provides for more cost-effective manufacturing as the wear of the moulds may be within larger tolerances, i.e. that more storage devices may be moulded in one mould before the tolerances of wear are reached for still having the proper functionality.

By means of such storage device it is possible to perform a reliable release of the data carrier from the storage device due to the possibility of accessing the rim of the data carrier in a more reliable and easy manner. The locking means will not provide any partly locking malfunction as they do not comprise any elements, where the function of these rely on the function of other similar elements. Since there are no mutually dependent release and ejector elements which requires a significant accuracy in the manufacturing process the storage device according to the invention does beside the above mentioned improved functionality provide a storage device which is simple from a manufacturing point of view. This also provides for more cost-effective manufacturing as the wear of the moulds may be within larger tolerances, i.e. that more storage devices may be moulded in one mould before the tolerances of wear are reached for still having the proper functionality.

Preferably there are between two and six, more preferably three or four discrete support elements for supporting the data carrier at the outer circumference. Between two adjacent support elements a space is left for accessing the data carrier.

In a preferred embodiment the storage device further comprise support means adapted for supporting the data carrier in the area between the central hole and the outer rim. This feature further facilitates the release of the data carrier from the arms. This support means may be in the form of a circular wall protruding from the base part and in a substantially perpendicular direction to this.

In a further preferred embodiment the storage device comprise means for limiting the movement inward movement of the arms towards the centre, e.g. in the form of a cylinder shaped element between the arms or within the area circumscribed by the arms.

The support means at the rim of the data carrier may be divided by curved recesses, which leads the users hands in the correct release position and which furthermore prevents the user from having finger injuries, as may be the case when sharp and abrupt edges are present.

In a further preferred embodiment the support means for supporting the outer rim of the data carrier are curved in a direction from the base part and towards the centre of the holding means. This also provides for an improved user safety and comfort.

The storage device may be incorporated in a box comprising two mutually pivotally connected parts. Preferably the base part forms one of these parts and a lid constitutes the other part.

The two parts comprise locking elements for releasable locking the two parts.

The lid part may comprise means for holding an insert, e.g. a user direction or a description of contents.

It is a possibility that the base part forms a loose element, which is placed inside a box having a bottom part and a lid, however this embodiment is far more irrational from a manufacturing point of view as more separate parts are necessary for completing the box.

DESCRIPTION OF THE PREFERRED EMBODIMENT

Figure 1:
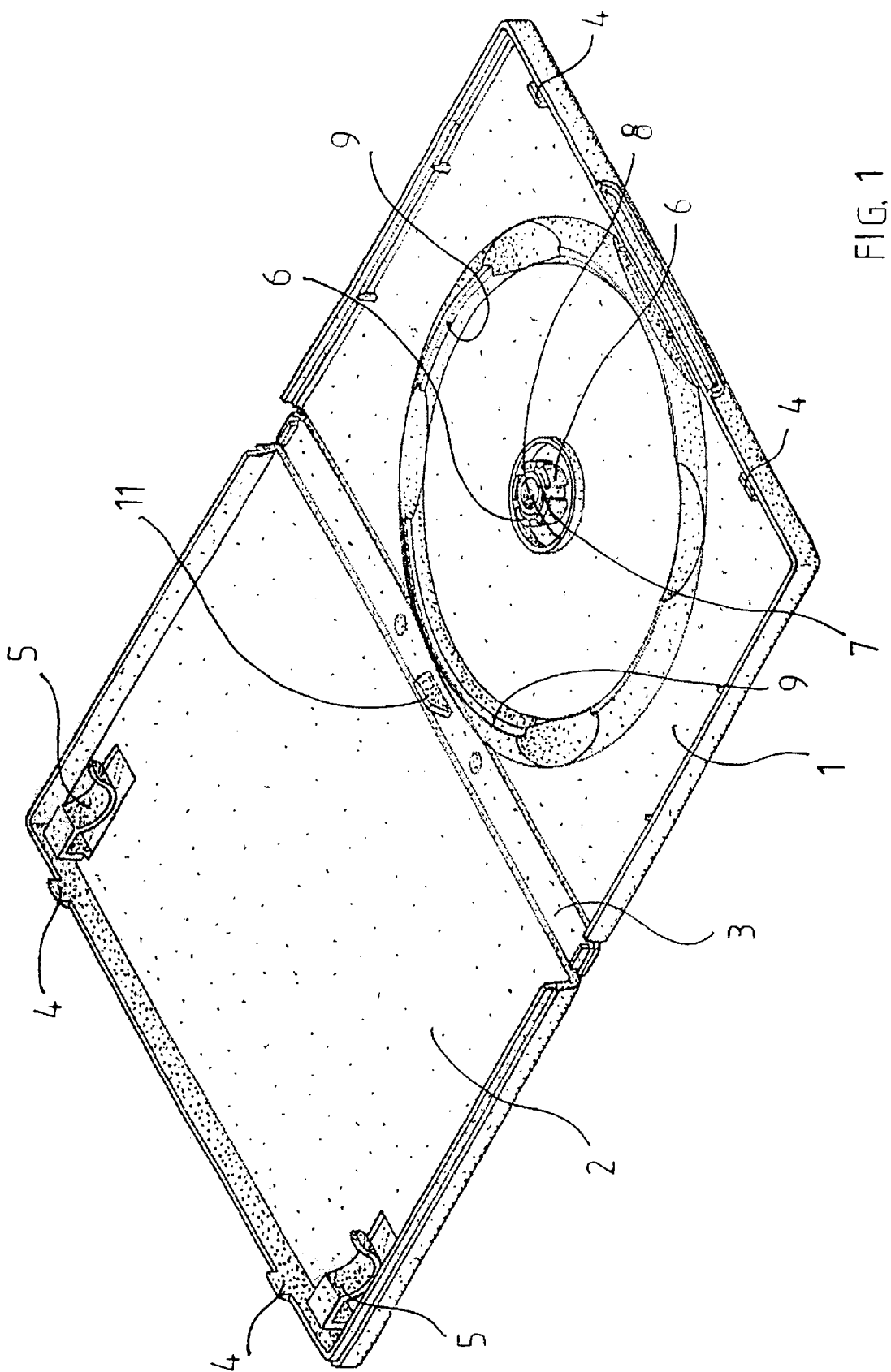
FIG. 1 is a perspective view of a preferred embodiment of the storage device according to the invention.

From FIG. 1 a storage device appears in the form of a box comprising a base element 1 and a lid 2. The base element and the lid are pivotally connected to a back element 3 and comprise means 4 for interlocking the two parts in a releasable manner. The lid comprises two flexible elements 5 for holding an insert.

The base element comprises a number of arms 6 extending perpendicular to the base element; in this case five arms 6. The number of arms may be lower or higher, but it has shown to be convenient that the number is of the order of four to six. Hereby the arms comply with the required rigidity and strength when the box is moulded from a soft plastics material in an injection moulding process. The arms are arranged in a circular order corresponding to the diameter of the hole in the data carrier. Within the circle of the arms a movement-limiting element 7 or a stop is provided in the form of a cylindrical element. By means of this it is possible to avoid a possible fatigue of the arms 6 due to several to extensive bending operations of these. Furthermore this element 7 serves as a rest for the users one finger when removing the data carrier from the storage device. In this manner the arms are freely movable without influence from the users finger. Surrounding the arms a circular support element 8 is provided to support the data carrier close to the central hole, preferably outside the data carrying area. At a further distance from the arms a number of discrete support elements 9, four in all, are provided for supporting the outer rim of the data carrier. The discrete support elements are provided with a mutual distance, which allows the user to access the rim of the data carrier in a safe and reliable manner. The area between the discrete support elements is formed by curved recesses, which when abutting the central element 7 with one finger allows for gripping the rim of the data carrier with another finger, preferably the thumb, whereby the data carrier may be released in the desired safe and reliable manner.

Figure 2:
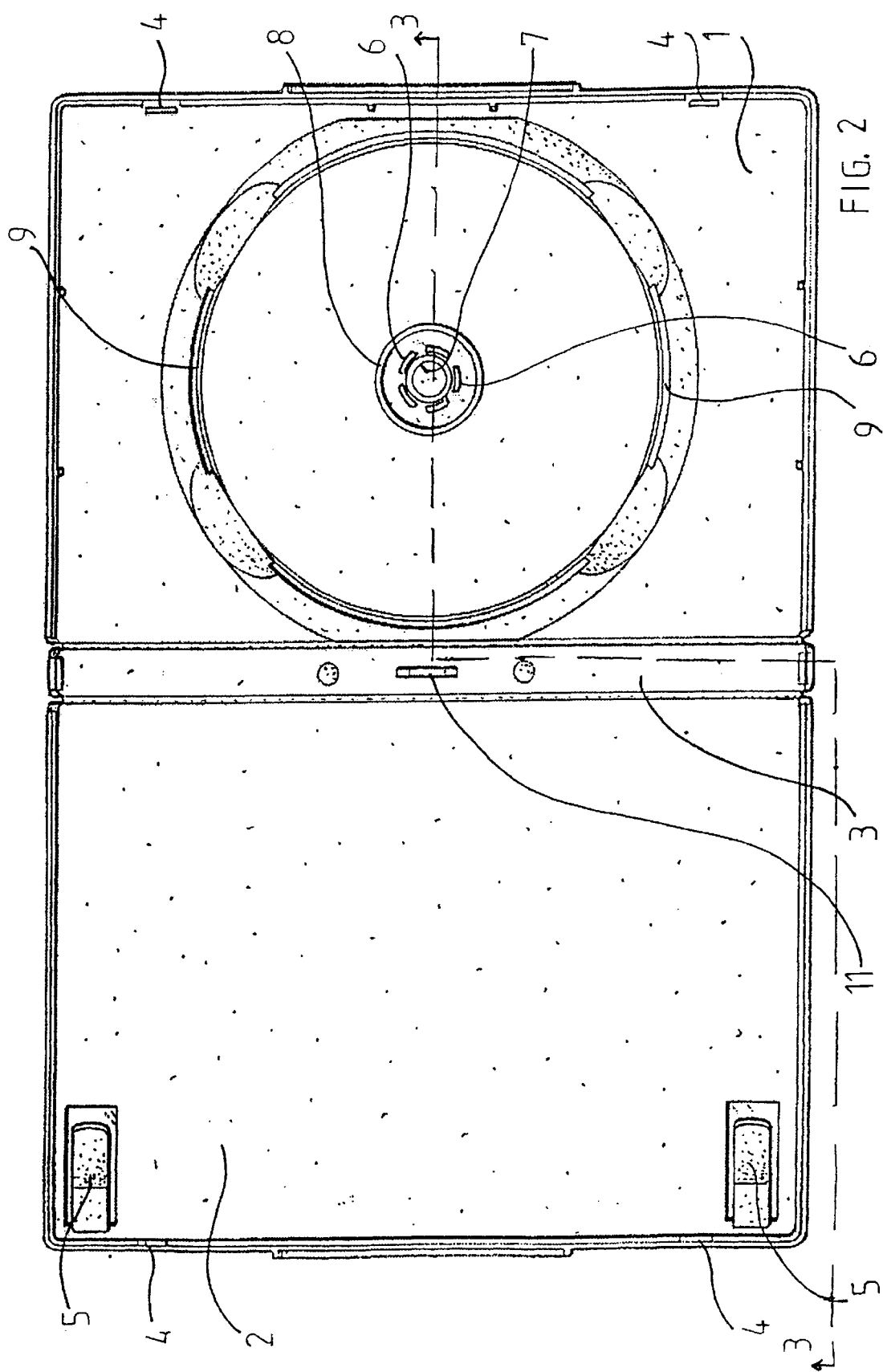
FIG. 2 is a top view of the storage device shown in FIG. 1.

From FIG. 2 the features shown on FIG. 1 and described above becomes apparent.

Figure 3:
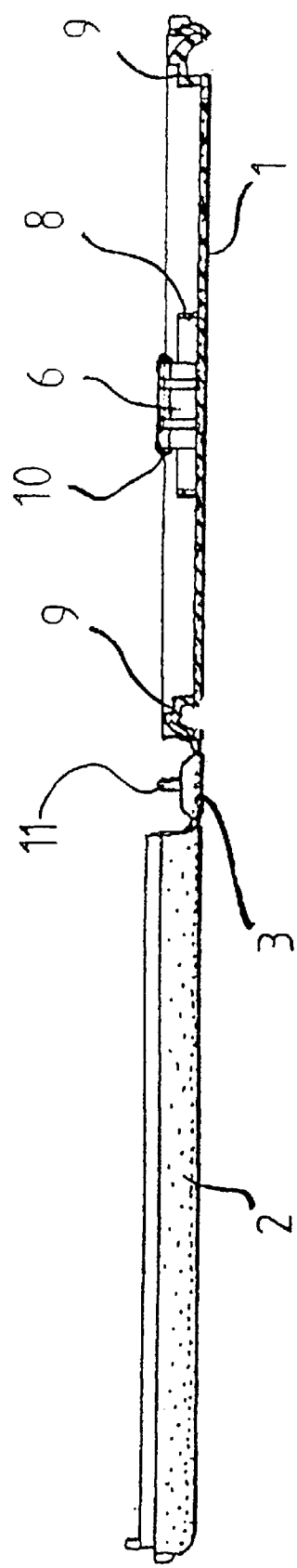
FIG. 3 is sectional view according to the line 3—3 in FIG. 2.

From FIG. 3, which is a sectional view, the arms are shown in more detail. It becomes apparent that the arms 6 each comprise a radial outward extending protrusion 10, which serves the purpose of locking the data carrier when the hole of this is pressed downwards over the arms.

On the inside of the back element 3 a holding element 11 appears in the form of a fin. The holding element serves the purpose of preventing the disc from being released from the central holding element as the holding element protrudes beyond the area 9 when the storage device is closed. When the storage device is in its open position as shown in FIGS. 1–3 the holding element is in a neutral position. Further such holding elements may be provided in the lid part 2.

The arms 6 may be arranged in such a manner and with such dimensions that the disc once placed and secured may be turned with very limited friction, which will allow the user to read text on the disc with out removing the disc from the storage device or without turning the latter.

The area 8 may be slightly higher than the area 9, hereby allowing a disc to be turned without contact at the outer circumference.

What is claimed is:

1. A storage for a data carrier with a central hole, an outer circumference and a circumferential rim, the storage device comprising:
   a base element;
   at least four flexible arms extending in a direction perpendicular to the base element and having free ends;
   at least one support element for supporting the data carrier at the outer circumference;
   the support element(s) leaving a space allowing a grip under the circumferential rim of the data carrier, and
   means for limiting movement of the flexible arms, said means being a cylinder shaped element located between the arms or within the area circumscribed by the arms.

2. A storage device according to claim 1, further comprising support means adapted for supporting the data carrier in an area between the central hole and the circumferential rim.

3. A storage device according to claim 2, wherein the support means for supporting the data carrier between the central hole and the circumferential rim is a circular wall protruding from the base part and in a direction substantially perpendicular thereto.

4. A storage device according to claim 1, wherein the support means at the circumferential rim of the data carrier are separated by curved recesses.

5. A storage device according to claim 1, wherein the support means at the circumferential rim of the data carrier are curved in a direction from the base part and towards the flexible arms.

* * * * *